United States Patent [19]

Rajendren et al.

[11] Patent Number: 5,183,596
[45] Date of Patent: Feb. 2, 1993

[54] REPLACEABLE SEAL MODULE FOR LIQUID AERATORS

[75] Inventors: Richard Rajendren, Belle Plaine; Peter S. Gross, Plymouth; Eric G. Bollensen, Columbia Heights, all of Minn.

[73] Assignee: Aeromix Systems, Incorporated, Minneapolis, Minn.

[21] Appl. No.: 806,646

[22] Filed: Dec. 13, 1991

[51] Int. Cl.⁵ .................................................. B01F 5/10
[52] U.S. Cl. ........................................ 261/93; 384/148
[58] Field of Search .................. 261/93; 384/147, 148, 384/903, 44, 539, 542

[56] References Cited

U.S. PATENT DOCUMENTS

| 1,626,092 | 4/1927 | Master | 384/542 |
| 3,025,113 | 3/1962 | Helwig | 384/148 |
| 3,214,149 | 10/1965 | Budzien | 261/93 |
| 3,336,091 | 8/1967 | Ramsdell | 384/148 |
| 3,343,891 | 9/1967 | Shipman | 384/147 |
| 3,415,581 | 12/1968 | Seubert | 384/147 |
| 3,847,453 | 11/1974 | Herbert | 384/148 |
| 4,138,168 | 2/1979 | Herlitzek | 384/903 |
| 4,308,221 | 12/1981 | Durda | 261/93 |
| 4,618,427 | 10/1986 | Venas | 261/87 |
| 4,741,870 | 12/1991 | Gross | 261/93 |

FOREIGN PATENT DOCUMENTS 573728 12/1945 United Kingdom ................ 384/147

Primary Examiner—Tim Miles
Attorney, Agent, or Firm—Kinney & Lange

[57] ABSTRACT

An apparatus for the treatment of liquid by aeration is provided. The apparatus has a motor, a propeller carried by a motor-driven shaft, an air flow passage to the propeller, bearings supporting the shaft at a location spaced from the motor and at least one bearing seal between a bearing and the propeller. In accordance with the present invention, a module for releasably carrying at least one of the bearing seals is detachably secured about the shaft to faciliate removal of at least the bearing seals from the apparatus.

6 Claims, 2 Drawing Sheets

REPLACEABLE SEAL MODULE FOR LIQUID AERATORS

BACKGROUND OF THE INVENTION

The present invention relates to aerators for the treatment of liquids and, in particular, to modules which facilitate the repair and/or replacement of bearings and/or bearing seals used in liquid aerators.

Aerators for the treatment of liquid, and particularly water, are known in the prior art. Such treatment is employed to encourage aerobic bacteria activity, as in the treatment of waste water, for example. Aerators may also be employed in the treatment of water bodies generally; such as to render them more potable, suitable for food production, or to return them to their natural state.

An aerator typically has a motor, a propeller carried by a motor driven shaft, a passage for airflow to the propeller and at least one bearing to support the shaft against deflection. In addition, a typical aerator includes bearing seals in association with each of the bearings in an attempt to block liquid from the bearings.

In the aerator described in U.S. Pat. No. 4,741,870 issued May 3, 1988, for APPARATUS FOR TREATMENT OF LIQUIDS, in the name of Peter S. Gross, a bearing and its associated bearing seal are supported in a tubular cantilever. Both the bearing and the bearing seal are press-fitted into the cantilever with the bearing seal acting to protect the bearing from the liquid being treated. Over a period of time, the bearing and the bearing seals will wear from use. The nature of the liquid being treated may also affect the life of the bearing and/or the bearing seal. In any event, when one or both of the bearing and/or the bearing seal is damaged, or otherwise impaired by wear or use, replacement is required. However, the very nature of the press-fit by which the bearing and the bearing seal are mounted renders them very difficult to remove from the housing. This is particularly true when repairs are attempted in the field. During the replacement procedure, damage to the aerator is a major concern.

SUMMARY OF THE INVENTION

The present invention provides an improvement to an aerator of the type generally described above including a motor, a propeller carried by a motor driven shaft, an airflow passage to the propeller, at least one bearing and at least one bearing seal associated with each bearing. Each bearing supports the shaft at a location spaced from the motor. A bearing seal is typically positioned between each bearing and the propeller. In the improvement of the present invention, a module is provided for at least the bearing seal to facilitate removal of the bearing seal and improve access to the bearing itself. In this manner, servicing of the bearing and the bearing seal is facilitated and field servicing of the aerator is more practical.

BRIEF DESCRIPTION OF THE DRAWINGS

FIG. 3 is a sectional view taken along line 3—3 in FIG. 2.

DETAILED DESCRIPTION OF THE PREFERRED EMBODIMENTS

Figure 1:
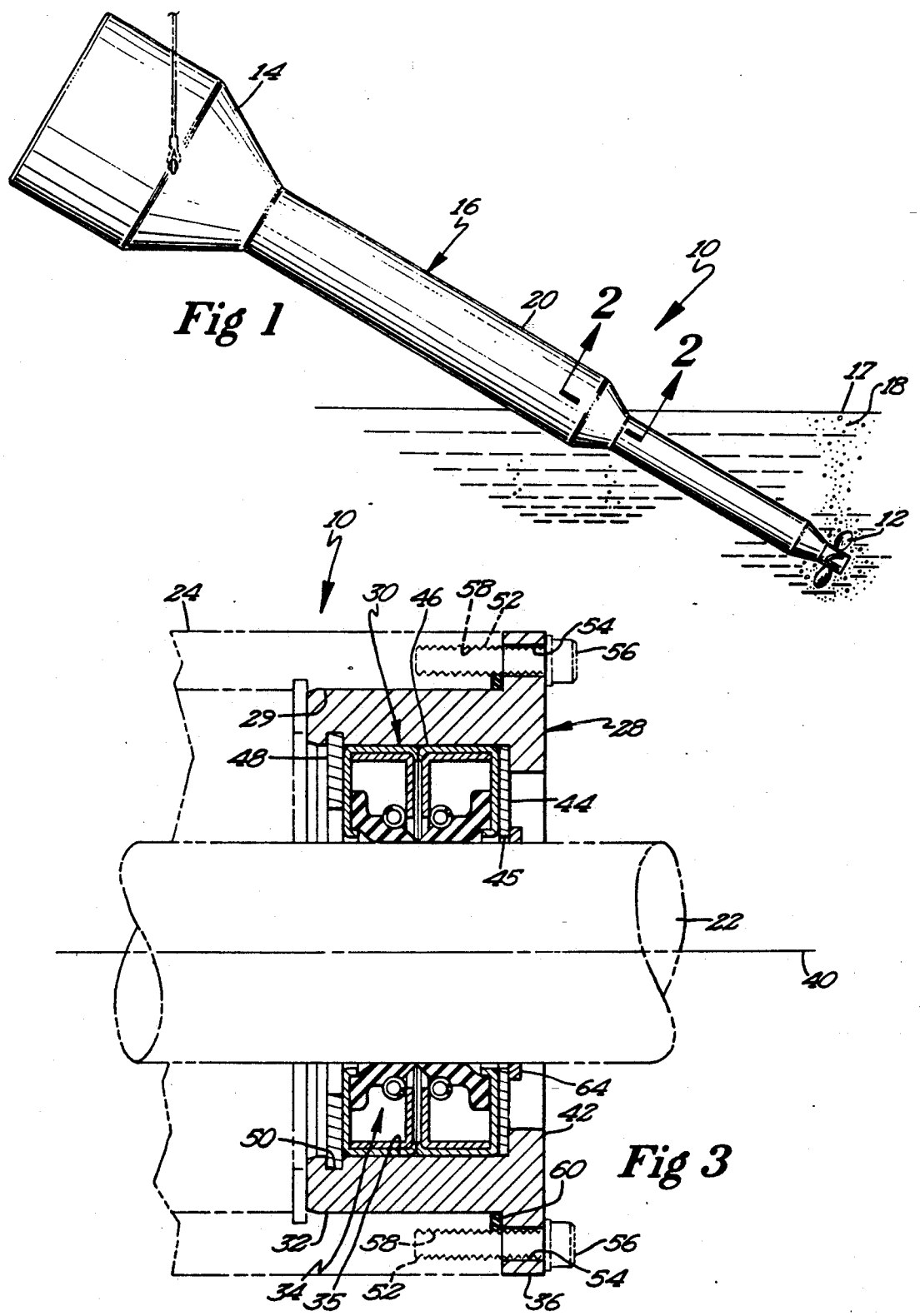
FIG. 1 illustrates the external configuration of an aerator incorporating the present invention.

In FIG. 1, there is illustrated an external view of an aerator, designated generally at 10. The aerator 10 includes a motor housing or cowl 14 positioned above a surface 17 of a body of liquid 18 and a propeller 12. A leg portion 16 extends between the propeller 12 and the motor housing 14. The propeller 12 is below the liquid surface 17.

Dependent on the application, the aerator 10 may be supported at any desired angle. A typical angle has the aerator oriented at approximately 30° from horizontal as illustrated in FIG. 1. The horizontal corresponds to the surface 17 of the liquid 18. The motor (within the motor housing 14) is supported above the liquid surface level 17 in any known manner (not shown) while the propeller 12 is carried by a motor driven shaft 22 (see FIGS. 2 and 3) to extend into the liquid 18 a desired distance during operation of the aerator 10. As shown, the shaft 22 drives the propeller 12 and is within the leg 16 of the aerator 10.

Figure 2:
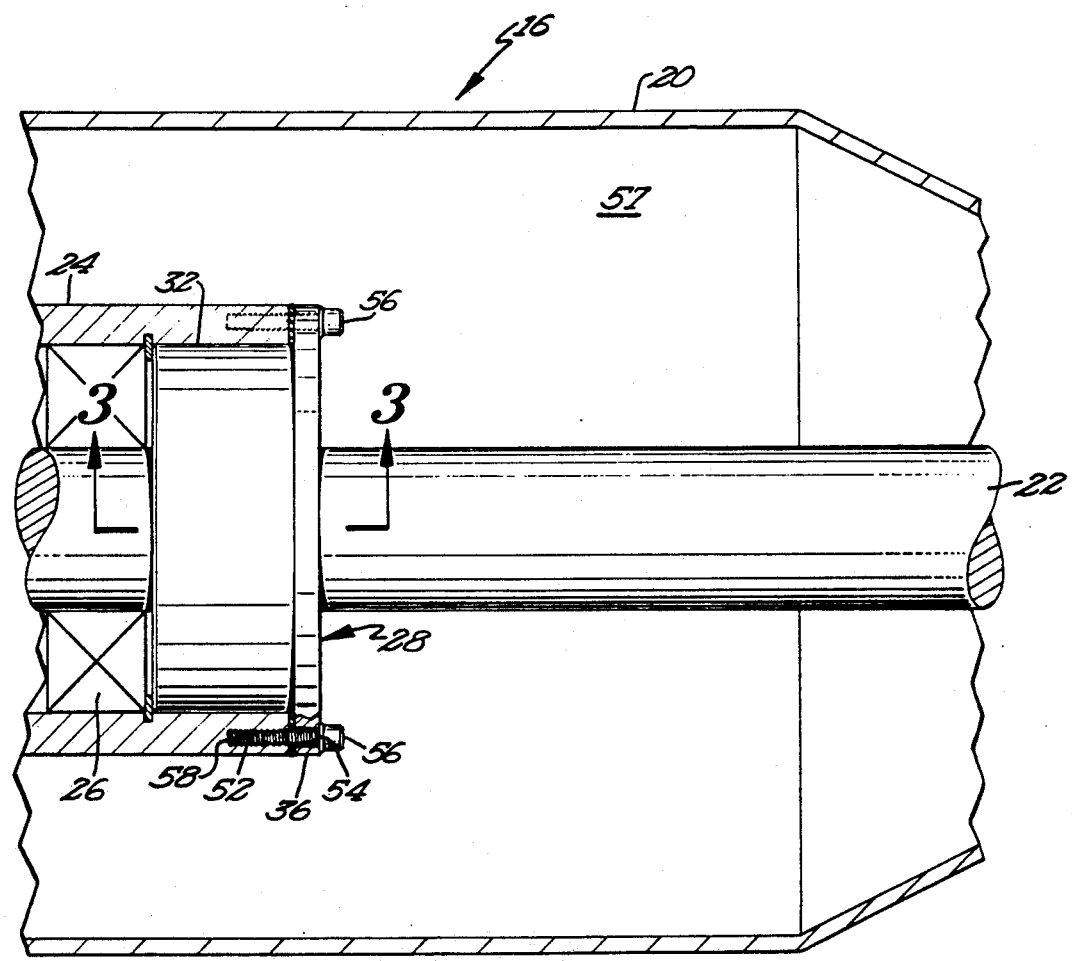
FIG. 2 is a sectional view and partial cutaway taken along line 2—2 in FIG. 1 illustrating a preferred embodiment of the present invention.

In addition to the improvement of the present invention, the drawings show a typical prior art aeration device with the propeller 12, the motor housing 14 and leg 16 being as described in the above referenced U.S. Pat. No. 4,741,870 which is assigned to the assignee of the present invention and which is hereby incorporated herein by reference. As illustrated in FIG. 2, the leg 16 is formed of an outer housing 20 through which a motor driven shaft 22 extends. The propeller 12 (not shown in FIG. 2) is of any type known to the art, as is its securement to the shaft 22 and communication with an air passage 57 formed by the outer housing 20. Air is drawn into and through the air passage 57 of the leg 16 on rotation of the propeller 12 (not shown in FIG. 2) and is discharged into the liquid 18 generally adjacent the propeller 12.

In the illustrated embodiment, the shaft 22 is solid while an inner housing or tubular cantilever 24, as described in U.S. Pat. No. 4,741,870, is supported at one of its ends within the leg 16 in surrounding relation to the shaft 22. The tubular cantilever 24 extends from its supported end away from the motor. As illustrated in FIG. 2, the shaft 22 is supported within the tubular cantilever 24 by at least one bearing 26 spaced from the motor along the shaft 22 and the tubular cantilever 24. The bearing 26 can include tapered roller bearings or other conventional bearings to provide not only support of the shaft 22 against deflection but also against longitudinal movement under the influence of forces transmitted to the shaft 22 by the action of the propeller 12 rotating in the liquid 18.

In accordance with the present invention and as illustrated in FIG. 3, a bearing seal module 28 is provided to facilitate removal of at least the bearing seals 30 from the aerator 10. The module 28 includes a substantially cylindrical main body portion 32 with an outside surface 29 and a substantially cylindrical passage 34 therethrough. The cylindrical passage 34 includes an inside wall 35.

In a first embodiment of the present invention, as illustrated in FIGS. 2 and 3, an annular flange 36 integral to the main body portion 32 is provided at one end of the seal module 28. The figures illustrate the annular flange 36 substantially perpendicular to a center axis 40 of the main body portion 32 which coincides with the axis of rotation of the shaft 22. The module 28 further includes an annular shoulder 42 within the passage 34 protruding from the inside wall 35 substantially opposite the annular flange 36.

To assemble the module 28 of the first embodiment of the present invention, a seal cover 44 is first inserted into the passage 34 of the main body portion 32 until the seal cover 44 rests against the annular shoulder 42. The seal cover 44 includes an aperture 45 therethrough for receiving the shaft 22 and is preferably an annular, flat sheet of stainless steel having a diameter approximately equal to the diameter of the passage 34. In the illustrated embodiment, the seal cover 44 is positioned between the bearing seals 30 and the liquid 18 to protect the bearing seals 30 from any damaging substances deflected toward the bearing seals 30 from the action of the propeller 22.

Subsequent to the insertion of the seal cover 44, at least one bearing seal 30 is inserted into the passage 34 of the main body portion 32 until the bearing seal 30 rests against the seal cover 44. If more than one bearing seal 30 is utilized, the next bearing seals 30 are inserted until they rest against the preceding bearing seals 30. Although it is within the scope of the present invention to have any number of bearing seals 30 within the module 28, the illustrated embodiment of the present invention includes a pair of bearing seals 30.

To prevent the bearing seals 30 from rotating upon rotation of the shaft 22, the bearing seals 30 preferably have an outside diameter approximately equal to the diameter of the passage 34 such that the bearing seals 30 will fit snugly within the passage 34 and against the inside wall 35, i.e., press fit. In addition to discouraging the bearing seals 30 from rotating, the press fit interferes with the passage of liquid 18 between the bearing seals 30 and the outside wall 35 of the passage 34.

Finally, a back snap ring 48 is fitted into a groove 50 formed in the inside wall 35 of the passage 34. The back snap ring 48 secures the bearing seals 30 within the module 28 and precludes any accidental dislodgement of the bearing seals 30 from the module 28 during operation of the aerator 10.

In a second embodiment of the present invention (illustrated in FIG. 4), the module 28 includes a groove 51 formed in the inside wall 35 of the module 28. A front snap ring 43 is positioned in the groove 51 such that the front snap ring 43 expands to be releasably secured within the passage 34. The front snap ring 43 assists in securing the bearing seals 30 within the module 28.

After the front snap ring 43 has been placed in the groove 51, the seal cover 44, the bearing seals 30 and the back snap ring 48 are positioned within the module 28 as described above.

An impermeable sealing substance (not shown) can be applied over and around either the seal cover 44 of the first embodiment or the seal cover 44 and the front snap ring 43 of the second embodiment to form a liquid impermeable seal around the seal cover 44 or the front snap ring 43. The sealing substance prevents the liquid 18 being aerated from entering the interior of the tubular cantilever 24 between either the seal cover 44 and/or the front snap ring 43 and the inside wall 35 of the passage 34.

In the illustrated embodiments, at least part of the main body portion of the module 28 has an outside diameter less than the inside diameter of the tubular cantilever 24. Therefore, to place the module 28 of the first embodiment into position, the main body portion 32 is inserted into the tubular cantilever 24 until the annular flange 36 rests against an end portion 52 of the tubular cantilever 24. The module 28 is then secured to the end portion 52 of the tubular cantilever 24 by a plurality of bolts 56 extending through corresponding apertures 54 in the flange 36. The bolts 56 are threadably received in corresponding threaded apertures 58 in the tubular cantilever 24.

An 0-ring 60 is positioned between the flange 36 and the tubular cantilever 24. The 0-ring 60 seals the inside of the tubular cantilever 24 from any liquid 18 attempting to enter the tubular cantilever 24 between the underside 51 of the annular flange 36 and the tubular cantilever 24.

Figure 4:
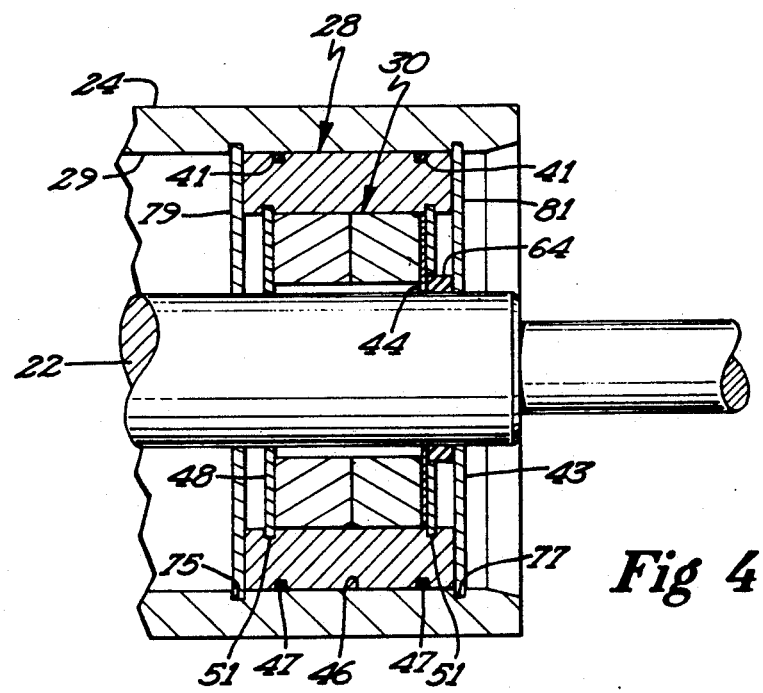
FIG. 4 is a sectional view of an embodiment of the present invention.

In the second embodiment of the present invention, as illustrated in FIG. 4, the module 28 includes a plurality of indentations 41 formed in the outside surface 29 of the main body portion module 28. An 0-ring 47 is positioned in each of the indentations 41. The 0-rings 47 seal the inside of the tubular cantilever 24 from any liquid 18 attempting to enter the tubular cantilever 24 between the outside surface 29 of the module 28 and the tubular cantilever 24 after the module 28 has been secured within the tubular cantilever 24 as described below.

In the second embodiment, a plurality of spaced-apart grooves 75 and 77 are formed in the inside surface of the tubular cantilever 24. A first snap ring 79 is releasably secured within groove 75. The module 28 is then inserted into the tubular cantilever 24 until the module 28 rests against the first snap ring 79. A second snap ring 81 is then releasably secured within groove 77 thereby releasably securing the module 28 within the tubular cantilever 24.

It should be noted that rather than having the first snap ring 79 releasably secured within the groove 75, a shoulder (not shown) can instead be machined into the tubular cantilever 24. If such is the case, the module 28 is inserted into the tubular cantilever 24 until it rests against the shoulder.

Once the module 28 has been releasably attached to the end portion 52 of the tubular cantilever 24 in accordance with the first embodiment or positioned within the tubular cantilever 24 in accordance with the second embodiment, a rubber lip seal 64 is positioned snugly about the shaft 22 to rest against the seal cover 44. In both embodiments, the outside diameter of the lip seal 64 is greater than the inside diameter of the seal cover 44 and, in the second embodiment only, less than the inside diameter of the front snap ring 43 so that the lip seal 64 rotates upon the rotation of the shaft 22. The lip seal 64 provides additional protection for the bearing 26 by preventing the liquid 18 being aerated from entering the interior of the tubular cantilever 24 between the bearing seals 30 and the shaft 22.

To replace the bearing 26 and the bearing seals 30 after either or both have been damaged or otherwise impaired by wear or use, the module 28 is extracted from within the tubular cantilever 24 by either removing the bolts 56 from the apertures 54 and 58 or by removing the second snap ring 81. By removing the module 28, the bearing 26 is now accessible for repair or replacement. Of course, the bearing seals 30 may be replaced by simply replacing the module 28.

To gain access to the bearing seals 30, the back snap ring 48 is quickly and easily removed from the module 28 in a known fashion. The bearing seals 30 are now easily accessible and removable without the need for expensive or cumbersome tools or hardware. In addition, there is no need to further disassemble or otherwise dismantle the aerator 10 simply to have access to the bearing seals 30.

Although the present invention has been described with reference to preferred embodiments, workers skilled in the art will recognize that changes may be made in form and detail without departing from the spirit and scope of the invention. For example, it may be desirable to mount the bearings within a module such as 28 with appropriate bearing seals 30.

What is claimed is:

1. In an apparatus for the treatment of liquids by aeration of the type having a motor, a propeller carried by a motor driven shaft, means defining an airflow passage to the propeller, bearing support means for supporting at least one bearing, each bearing supporting the shaft at a location spaced from the motor, and at least one bearing seal positioned about the shaft between a bearing and the propeller, the improvement comprising:
   a housing surrounding at least a portion of the shaft;
   a module having a flange portion, the module carrying at least the bearing seal and being detachably secured about the shaft to facilitate removal of the bearing seal wherein at least a portion of the module is positioned within the housing;
   a plurality of bolts attaching the module to the housing at the flange portion; and
   sealing means positioned between the flange portion and the housing to prevent liquid from entering an interior of the housing between the flange portion and the housing.

2. The apparatus of claim 1 wherein the module carries a plurality of bearing seals.

3. The apparatus of claim 1 wherein the module comprises a substantially cylindrical member having a substantially cylindrical passage therethrough, the bearing seal being press fit within the cylindrical passage.

4. In an apparatus for the treatment of liquids by aeration of the type having a motor, a propeller carried by a motor driven shaft, means defining an airflow passage to the propeller, bearing support means for supporting at least one bearing, each bearing supporting the shaft at a location spaced from the motor, and at least one bearing seal positioned about the shaft between a bearing and the propeller, the improvement comprising:
   a module carrying at least the bearing seal and being detachably secured about the shaft to facilitate removal of the bearing seal, the bearing seal directly contacting the shaft to prevent liquid from reaching the bearing between the bearing seal and the shaft;
   a plurality of grooves formed on an inner surface of the bearing support means; and
   a split ring received within each groove to thereby releasably secure the module therebetween.

5. The apparatus of claim 4 wherein the module carries a plurality of bearing seals.

6. The apparatus of claim 4 wherein the module comprises a substantially cylindrical member having a substantially cylindrical passage therethrough, the bearing seal being press fit within the cylindrical passage.

* * * * *